(12) United States Patent
Shin et al.

(10) Patent No.: US 10,649,502 B2
(45) Date of Patent: May 12, 2020

(54) ELECTRONIC APPARATUS AND CONTROL METHOD THEREOF

(71) Applicant: Samsung Electronics Co., Ltd., Suwon-si, Gyeonggi-do (KR)

(72) Inventors: Jong Min Shin, Suwon-si (KR); Seung Wook Choi, Suwon-si (KR); Jin Young Bae, Suwon-si (KR); Chang Lae Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/225,384

(22) Filed: Dec. 19, 2018

(65) Prior Publication Data

US 2019/0196554 A1 Jun. 27, 2019

(30) Foreign Application Priority Data

Dec. 22, 2017 (KR) ........................ 10-2017-0178689

(51) Int. Cl.
*H04W 88/02* (2009.01)
*G06F 1/16* (2006.01)
*H04L 29/08* (2006.01)
*H04L 29/06* (2006.01)
*H04L 29/04* (2006.01)

(52) U.S. Cl.
CPC ............ *G06F 1/1698* (2013.01); *H04L 29/04* (2013.01); *H04L 65/1069* (2013.01); *H04L 65/403* (2013.01); *H04L 67/125* (2013.01); *H04L 67/18* (2013.01); *H04W 88/02* (2013.01); *H04L 65/4076* (2013.01)

(58) Field of Classification Search
CPC ....... H04W 4/12; H04W 84/12; H04W 12/06; H04W 12/08; H04W 88/06
See application file for complete search history.

(56) References Cited

U.S. PATENT DOCUMENTS

| 7,676,226 B2 | 3/2010 | Han et al. |
| 7,801,095 B2 | 9/2010 | Kil |
| 2004/0266430 A1 | 12/2004 | Fudim et al. |
| 2005/0255847 A1 | 11/2005 | Han et al. |
| 2006/0221993 A1 | 10/2006 | Liao et al. |
| 2015/0043366 A1 | 2/2015 | Kneckt et al. |
| 2015/0162969 A1 | 6/2015 | Wentink |

OTHER PUBLICATIONS

International Search Report and Written Opinion of the International Searching Authority dated Mar. 20, 2019 in International Patent Application No. PCT/KR2018/016250.

*Primary Examiner* — Sam Bhattacharya
(74) *Attorney, Agent, or Firm* — Staas & Halsey LLP

(57) ABSTRACT

An electronic apparatus includes a communicator; and a processor configured to: transmit a message including a communication connection order among a plurality of terminals to the plurality of terminals through the communicator, and control the communicator to sequentially perform connections with the plurality of terminals corresponding to association requests respectively received from the plurality of terminals after transmitting the message.

20 Claims, 7 Drawing Sheets

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application No. 10-2017-0178689 filed on Dec. 22, 2017 in the Korean Intellectual Property Office, the disclosure of which is incorporated by reference herein in its entirety.

BACKGROUND

1. Field

The present disclosure relates to an electronic apparatus used for communication with a plurality of terminals in a network system and a control method thereof, and more particularly, to an electronic apparatus, which has a structure for performing communication reconnection with terminals when an event for initializing communication connection occurs during an operation in a state that the communication connection with each terminal is performed to establish a network, and a control method thereof.

2. Description of the Related Art

To compute and process predetermined information in accordance with various processes, an electronic apparatus basically includes a central processing unit (CPU), a chipset, a memory, and similar electronic components for computation. Such an electronic apparatus may be variously classified in accordance with what information will be processed. For example, the electronic apparatus is classified into an information processing apparatus such as a personal computer (PC), a server, or the like for processing general information, and an image processing apparatus for processing image information. Various electronic apparatuses such as an image processing apparatus, a display apparatus, an information processing apparatus, etc. are provided as entities to perform previously given functions by themselves.

Meanwhile, a plurality of electronic apparatuses are connected to perform communication with one another and form a network system, and the electronic apparatuses collaborate with one another under such a system to thereby perform various extended functions that cannot be performed by each individual entity. As a general and simple example of the network system, there is a home network established in a home. Here, the network system may involve not only electronic apparatuses in usual acceptation, but also an electric light bulb and similar entities, each of which corresponds to a simple function and includes a sensor and a communication module to be in the network system. As an example of such a concept, there is Internet of things (IoT).

As one of methods of constructing the network system, there is an infrastructure construction. In the network system having the infrastructure construction, an electronic apparatus among a plurality of electronic apparatuses serves as a hub, a gateway, or a communication relay for communication, and relays the communication between other electronic apparatuses. A representative example of such an electronic apparatus is an access point (AP) for supporting wireless communication such as Wi-Fi. The AP is connected to a wireless area network (WAN) by a wire, and performs wireless communication with a plurality of terminals, thereby allowing each terminal to access the WAN.

For various reasons, the AP may need rebooting while being in operation. For example, the rebooting may be needed when the AP abnormally operates in terms of network management, or when the AP is required to update software, etc. However, when the AP is rebooted, a communication connection configuration constructed between the AP and the plurality of terminals is reset or initialized. When the plurality of terminals determines that the communication with the AP is disconnected, each terminal transmits a communication reconnection request to the AP, and the AP processes the communication reconnection with each terminal in response to the request from each terminal.

However, each individual terminal makes the communication reconnection request without taking another terminal into account, and therefore the AP receives requests from all of the plurality of terminals simultaneously, thereby exponentially increasing probability that a data or process collision occurs. Because the collision causes data loss, undone process, etc., the number of signal retransmission times increases, and an access is delayed by the terminals.

SUMMARY

Additional aspects and/or advantages will be set forth in part in the description which follows and, in part, will be apparent from the description, or may be learned by practice of the disclosure.

According to an embodiment of the present disclosure, there is provided an electronic apparatus including: a communicator; and a processor configured to: transmit a message including a communication connection order among a plurality of terminals to the plurality of terminals through the communicator, and control the communicator to sequentially perform connections with the plurality of terminals corresponding to association requests respectively received from the plurality of terminals after transmitting the message. Thus, an electronic apparatus prevents a collision phenomenon while performing communication reconnection with a plurality of terminals in a system.

The processor may transmit the message including an order of requesting a second communication connection with the plurality of terminals to the plurality of terminals as a first communication connection with the plurality of terminals using the communicator is initialized.

The processor may determine that the first communication connection is initialized as the electronic apparatus is rebooted.

The electronic apparatus may further include a storage configured to store association information about the first communication connection with the plurality of terminals, wherein the processor may determine the order of requesting the second communication connection based on the association information stored in the storage.

The processor may transmit the message in a broadcast mode through the communicator.

The message may include media access control (MAC) addresses of the plurality of terminals for identifying the plurality of terminals.

The association information may include information about at least one of a data rate, a communication point in time, and a communication frequency with regard to the terminal.

The processor may transmit the message with preset identification information to make the terminal identify whether data received therein corresponds to the message.

According to an embodiment of the present disclosure, there is provided a terminal apparatus including: a communicator; and a processor configured to control the communicator to transmit a communication connection request for communication connection with an electronic apparatus to the electronic apparatus, at timing corresponding to a communication connection order involved in a message, as the message including the order of the terminal apparatus is received from the electronic apparatus through the communicator.

The processor may control the communicator to transmit the communication connection request at a point in time when time corresponding to the order involved in the message is delayed from a point in time of receiving the message.

According to an embodiment of the present disclosure, there is provided a method of controlling an electronic apparatus, including: transmitting a message including a communication connection order among a plurality of terminals to the plurality of terminals; and sequentially performing connections with the plurality of terminals corresponding to association requests respectively received from the plurality of terminals after transmitting the message.

The transmitting of the message may include transmitting the message including an order of requesting a second communication connection with the plurality of terminals to the plurality of terminals as a first communication connection with the plurality of terminals using the communicator is initialized.

The method may further include determining that the first communication connection is initialized as the electronic apparatus is rebooted.

The method may further include determining the order of requesting the second communication connection based on previously stored association information about the first communication connection with the plurality of terminals.

The message may be transmitted in a broadcast mode.

The message may include media access control (MAC) addresses of the plurality of terminals for identifying the plurality of terminals.

The association information may include information about at least one of a data rate, a communication point in time, and a communication frequency with regard to the terminal.

The method may further include transmitting the message with preset identification information to make the terminal identify whether data received therein corresponds to the message.

According to an embodiment of the present disclosure, there is provided a method of controlling a terminal apparatus, including: receiving a message including a communication connection order of the terminal apparatus from an electronic apparatus; and transmitting the communication connection request for communication connection with an electronic apparatus to the electronic apparatus, at timing corresponding to the order involved in the message.

The method may further include transmitting the communication connection request at a point in time when time corresponding to the order involved in the message is delayed from a point in time of receiving the message.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, "at least one" among a plurality of elements in the disclosure represents not only all the elements but also each one of the elements, which excludes the other elements or includes all combinations of the elements.

Figure 1:
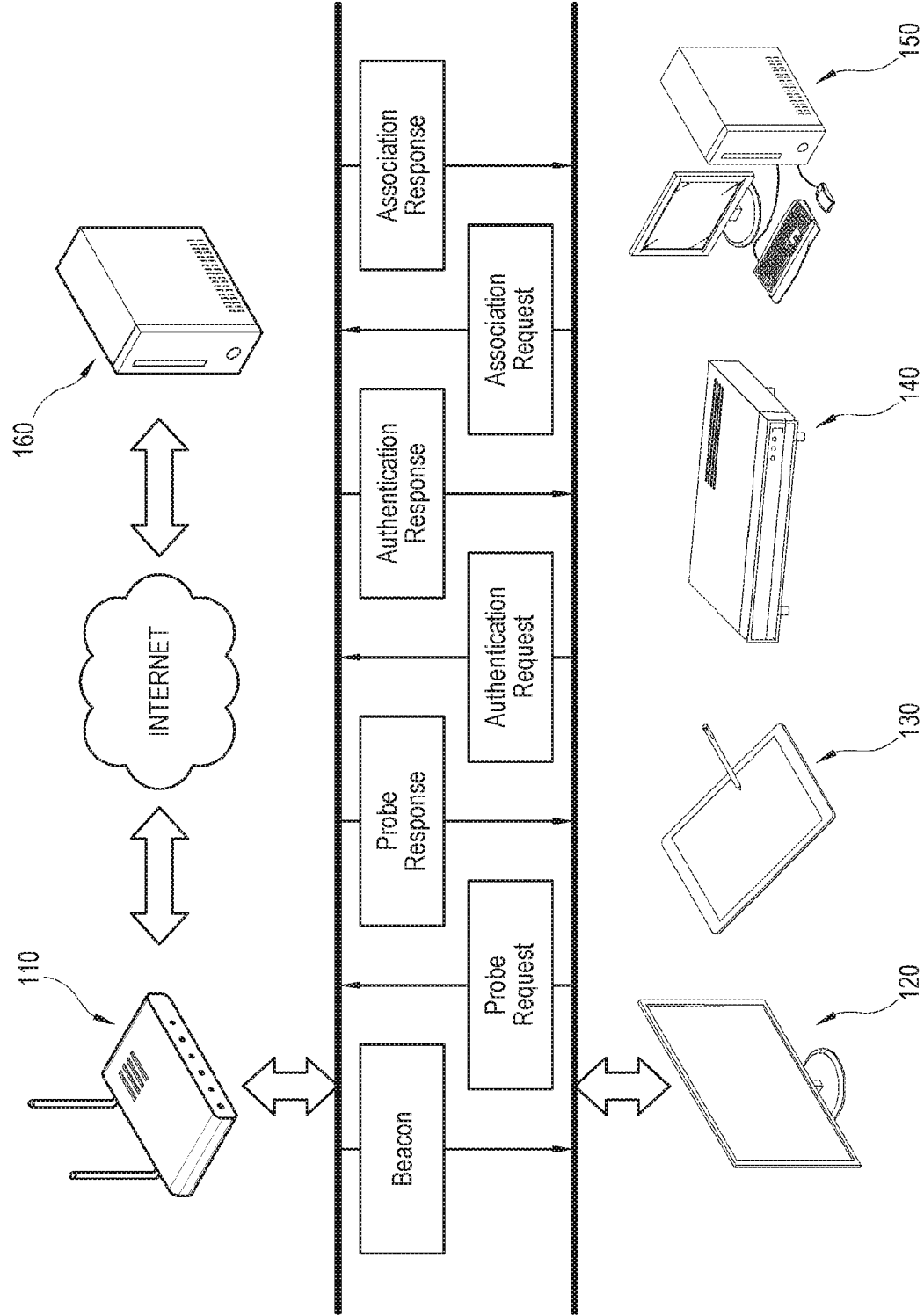
FIG. 1 illustrates an example of a network system according to an embodiment.

FIG. 1 illustrates an example of a network system according to an exemplary embodiment.

As shown in FIG. 1, the network system includes a plurality of electronic apparatuses 110, 120, 130, 140, and 150 connected to communicate with one another in accordance with preset communication standards. The network system in the embodiment supports wireless communication standards such as Wi-Fi and the like, considering various factors such as arranged positions of the electronic apparatuses 110, 120, 130, 140, and 150, and the electronic apparatuses 110, 120, 130, 140, and 150 perform communication with one another based on wireless communication.

The electronic apparatuses 110, 120, 130, 140, and 150 are not limited to a particular type of apparatuses, and include entities or things corresponding to various kinds, shapes, and functions. For example, the electronic apparatuses 110, 120, 130, 140, and 150 may be implemented by a TV, an electronic frame, and similar display apparatuses capable of displaying an image; a set-top box and the image processing apparatus capable of processing an image signal without directly displaying an image; a washing machine, a refrigerator, an air conditioner and similar general home appliances; a printer, a copying machine, a scanner, and a similar office machine; or a light bulb, an electric heater, and other apparatuses. Further, the electronic apparatuses 110, 120, 130, 140, and 150 may be implemented by various wearable devices or mobile devices.

The electronic apparatuses 110, 120, 130, 140, and 150 may have peer-to-peer communication connection for one-to-one direct communication with each other. However, when the number of electronic apparatuses 110, 120, 130, 140, and 150 increases within the network system, a peer-to-peer communication connection mode such as an ad-hoc mode or Wi-Fi Direct becomes restricted. Thus, the network system according to the embodiment has a communication connection structure of an infrastructure mode.

In the infrastructure mode, the plurality of electronic apparatuses 110, 120, 130, 140, and 150 of the network system are classified into two groups as follows. One is the electronic apparatus 110 connected to the Internet and serving as a communication host or a communication relay. The others are the electronic apparatuses 120, 130, 140, and 150 performing wireless communication connection with the electronic apparatus 110 and serving as terminals for communicating with the Internet and other electronic apparatuses.

The electronic apparatus 110 serves as a gateway via which other electronic apparatuses 120, 130, 140, and 150 of a communication layer lower than that of the electronic apparatus 110 are connected to the Internet of a communication layer higher than that of the electronic apparatus 110, so that the other electronic apparatuses 120, 130, 140, and 150 can communicate with a server 160 on the Internet. Further, the electronic apparatus 110 relays communication connection among other electronic apparatuses 120, 130, 140, and 150 within the network system.

To this end, the electronic apparatus 110 may be implemented by an access point (AP), a hub, a gateway, a router, etc. Alternatively, the electronic apparatus 110 may be implemented by a set-top box, a TV, home appliances, or the specific-functional electronic apparatus capable of functioning as the AP. In the embodiment, it will be described that the electronic apparatus 110 is implemented by the AP 110. Within the network system, one AP 110 is provided according to the embodiment. Alternatively, two or more APs may be provided according to designs.

Below, a procedure where terminals 120, 130, 140, and 150 perform initial communication connection with the AP 110 according to institute of electrical and electronics engineers (IEEE) 802.11 will be described. This procedure is divided into three procedures of probe, authentication, and association (or connection). The probe procedure includes operations of a beacon, a probe request, and a probe response; the authentication procedure includes an authentication request (or connection request) and an authentication response; and the association procedure (or connection procedure) includes an association request and an association response (or connection response).

In the probe procedure, the AP 110 periodically transmits the beacon in a broadcast mode. When the terminal 120, 130, 140, or 150 receives the beacon, the terminal 120, 130, 140, or 150 transmits the probe request to the AP 110 that transmits the beacon, thereby trying accessing the AP 110. The probe request transmitted from the terminal 120, 130, 140, or 150 to the AP 110 includes an identification name of the terminal 120, 130, 140, or 150, such as a media access control (MAC) address of the terminal 120, 130, 140, or 150, so that the AP 110 can identify the terminal 120, 130, 140, or 150. The AP 110 transmits the probe response to the terminal 120, 130, 140, or 150 in response to the probe request received from the terminal 120, 130, 140, or 150.

The beacon is a non-directional intermittent signal having a specific frequency and transmitted on a predetermined cycle. The beacon includes communication connection information about the AP 110, which is needed for the terminals 120, 130, 140, and 150 to have communication connection with the AP 110. The communication connection information may, for example, include a timestamp for synchronizing the electronic apparatuses 110, 120, 130, 140, and 150 in the system; a beacon interval for indicating a cycle of the beacon; capability information for specifying performance of the terminals 120, 130, 140, and 150 required to access the AP 110; a service set identifier (SSID) corresponding to the identification name of the AP 110; supported rates about a transmission speed and a modulation mode supported by the AP 110, etc.

In the authentication procedure, the terminal 120, 130, 140, or 150 transmits the authentication request to the AP 110. For example, the authentication request may include a password previously set to use the AP 110. The AP 110 may directly perform authentication based on the password, or may transmit the password from the terminal 120, 130, 140, or 150 to the server 160 separately provided for password authentication and receive an authentication result from the server 160. When the AP 110 determines that the authentication is successful, the AP 110 transmits the authentication response to the terminal 120, 130, 140, or 150.

The authentication procedure may use various methods as well as the authentication method using the password. For example, the AP 110 or the authentication server 160 includes a list of identification names corresponding to the terminals 120, 130, 140, and 150, and performs the authentication for an apparatus in accordance with whether or not the identification name of the apparatus that transmits the probe request to the AP 110 is on the list.

In the association procedure, the terminal 120, 130, 140, or 150 transmits the association request to the AP 110, and the AP 110 and transmits the association response to the terminal 120, 130, 140, or 150 in response to the association request, thereby completely establishing the communication connection between the AP 110 and the terminal 120, 130, 140, or 150.

Below, configurations of the AP 110 and the terminal 120, 130, 140, or 150 will be described.

Figure 2:
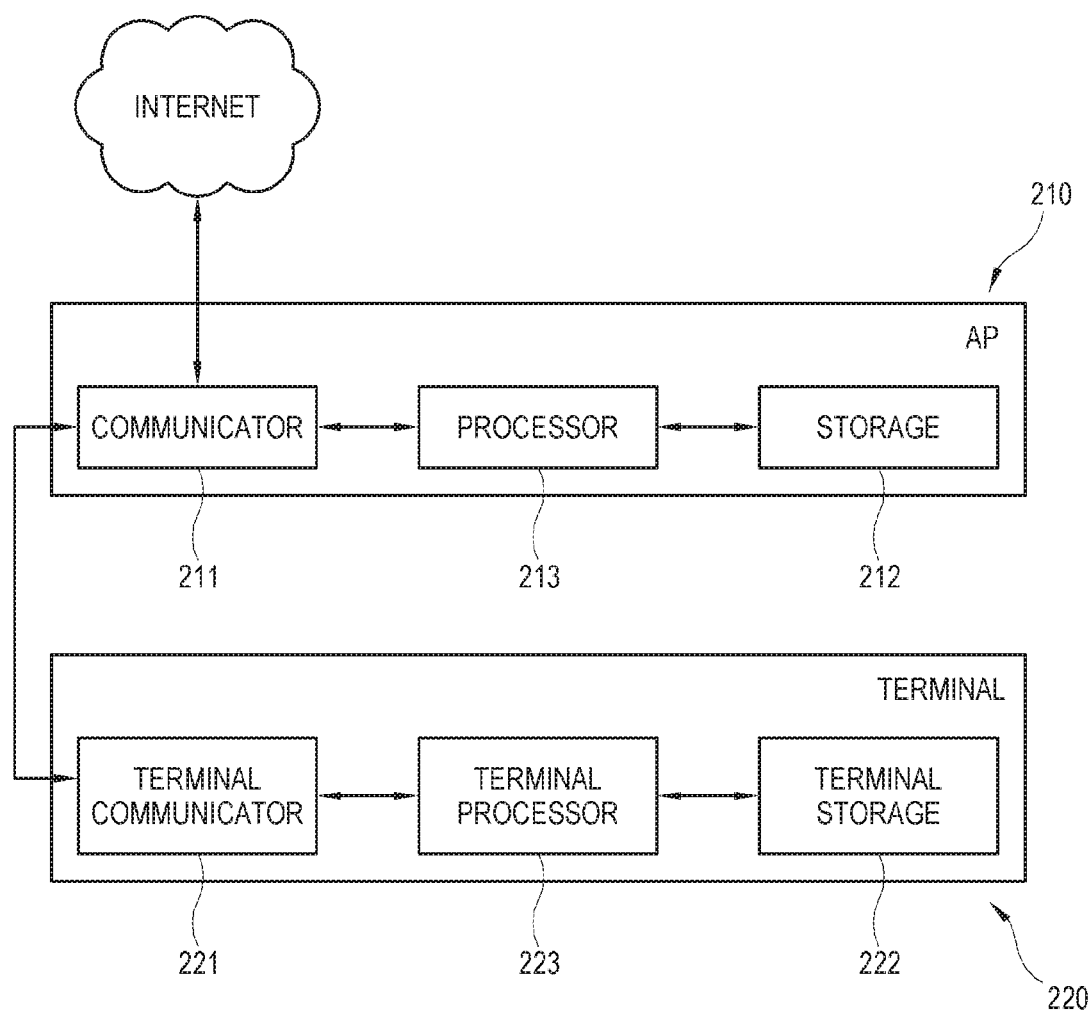
FIG. 2 is a block diagram of an access point (AP) and a terminal according to an embodiment.

FIG. 2 is a block diagram of an AP and a terminal according to an embodiment.

As shown in FIG. 2, an AP 210 includes a communicator 211 configured to communicate with the Internet and a terminal 220; a storage 212 configured to store data; and a processor 213 configured to process signals transmitted to and received from the Internet or the terminal 220 through the communicator 211.

Further, the terminal 220 includes a terminal communicator 221 configured to communicate with the AP 210; a terminal storage 222 configured to store data; and a terminal processor 223 configured to perform processes for communication with the AP 210, other terminals, the Internet, etc. through the terminal communicator 221 and the AP 210.

The communicator 211 refers to a communication circuit including data input/output interfaces where communication modules, communication chips, ports, etc. are combined corresponding to various wired and wireless communication protocols. For example, the communicator 211 is connected to a gateway or router by wire and thus accesses the Internet to thereby communicate with the Internet, and performs wireless communication with each terminal 220. In the embodiment, the communicator 211 supports Wi-Fi protocols, and thus enables interactive communication between the terminals 220 or between each terminal 220 and the Internet.

The storage 212 is accessed by the processor 213, and performs operations such as reading, recording, modifying, deleting, etc. for data under control of the processor 213. The storage 212 includes a flash memory, a hard disk drive (HDD), a solid state drive (SSD), and the like nonvolatile memory in which data is retained regardless of whether power is supplied or not; and a buffer, a random access memory (RAM) and the like volatile memory to which processing data is loaded. For example, the storage 212 in the embodiment is configured to store the unique information of the AP 210 such as service set identification (SSID) of the AP 210, and store the unique information of the terminal such as the identification name of the terminal 220 when the terminal 220 is in communication connection with the AP 210.

The processor 213 includes a hardware processor implemented by a central processing unit (CPU), a chipset, a buffer, a circuit, etc., which are mounted on a printed circuit board, and may be implemented by a system on chip (SoC) according to designs. As described above, the processor 213 constructs the communication connection with the terminals 220, and processes each terminal 220 to do communication operation through the AP 210 under a communication connection state. The processor 213 periodically transmits the beacon so that the terminal 220 being not in the communication connection state can try accessing the AP 210. The processor 213 transmits data received from the terminal 220 being in the communication connection state to other terminals 220 or the Internet, and transmits data received from other terminals or the Internet to the terminal 220.

The terminal communicator 221 includes a communication circuit such as a wireless communication chip, a wireless communication module, etc. provided to perform wireless communication with the AP 210. The terminal communicator 221 has a MAC address as a unique ID, and the MAC address of the terminal communicator 221 may be used as the identification name of the terminal 220.

The terminal storage 222 includes volatile and nonvolatile memories. The terminal storage 222 is configured to store information such as SSID for accessing the AP 210 when the terminal 220 is in the communication connection state with the AP 210. The terminal storage 222 provides the information to the terminal processor 223 so that the terminal processor 223 can identify the AP 210 to communicate with the AP 210.

The terminal processor 223 includes a hardware processor implemented by a CPU, a chipset, a buffer, a circuit, etc. mounted on a printed circuit board, and may be implemented by an SoC according to designs. The terminal processor 223 performs a procedure for communication connection when the beacon is received from the AP 210, and processes the terminal 220 to be in the communication connection state with the AP 210 according to the procedure.

With this structure, the processor 213 of the AP 210 according to an exemplary embodiment transmits a message about a communication connection order of the plurality of terminals 220 to each terminal 220, and sequentially performs the connection with the terminals 220 in response to an association request of each terminal 220 received after transmitting the message.

Meanwhile, the terminal processor 223 of the terminal 220 determines the communication connection order of the terminal 220 from the message when the message about the communication connection order of the plurality of termi-nals 220 is received from the AP 210. The terminal processor 223 makes a request for the communication connection to the AP 210 at a timing of the determined order, and performs the communication connection with the AP 210 in response to the response of the AP 210 to the request.

Thus, when the AP 210 is initialized by rebooting during an operation while being in the communication connection state with the plurality of terminals 220, it is possible to prevent a collision phenomenon that may occur as the terminals 200 simultaneously make the communication reconnection request to the AP 210.

Below, the collision phenomenon will be described. When the number of terminals 220 accessing the AP 210 is relatively small, like those in a home network, the collision phenomenon is less likely to occur. On the other hand, when the number of terminals 220 accessing the AP 210 is relatively large, like those in a subway or an event hall, the collision phenomenon is more likely to occur. When the AP 210 receives and processes communication reconnection requests from many terminals 220, the AP 210 processes the received requests in sequence. The request may be not processed when the buffer stores the content of the requests in excess of its capacity, when a particular request is not received by interference between the requests transmitted at the same time, when relevant data is lost due to a delay in processing the request, or because of other various unknown causes. The collision phenomenon refers to a case where a particular request is not processed due to interference or collision between the requests when the plurality of requests are received at the same time.

According to an exemplary embodiment, the AP 210 controls the plurality of terminals 220 to make the communication reconnection requests not simultaneously, but sequentially, leaving a time lag between the terminals 220 when the communication connection is initialized. Thus, according to an exemplary embodiment, the collision phenomenon is prevented, thereby reducing time taken in the communication reconnection throughout the system Below, a method of controlling the AP according to an exemplary embodiment will be described.

Figure 3:
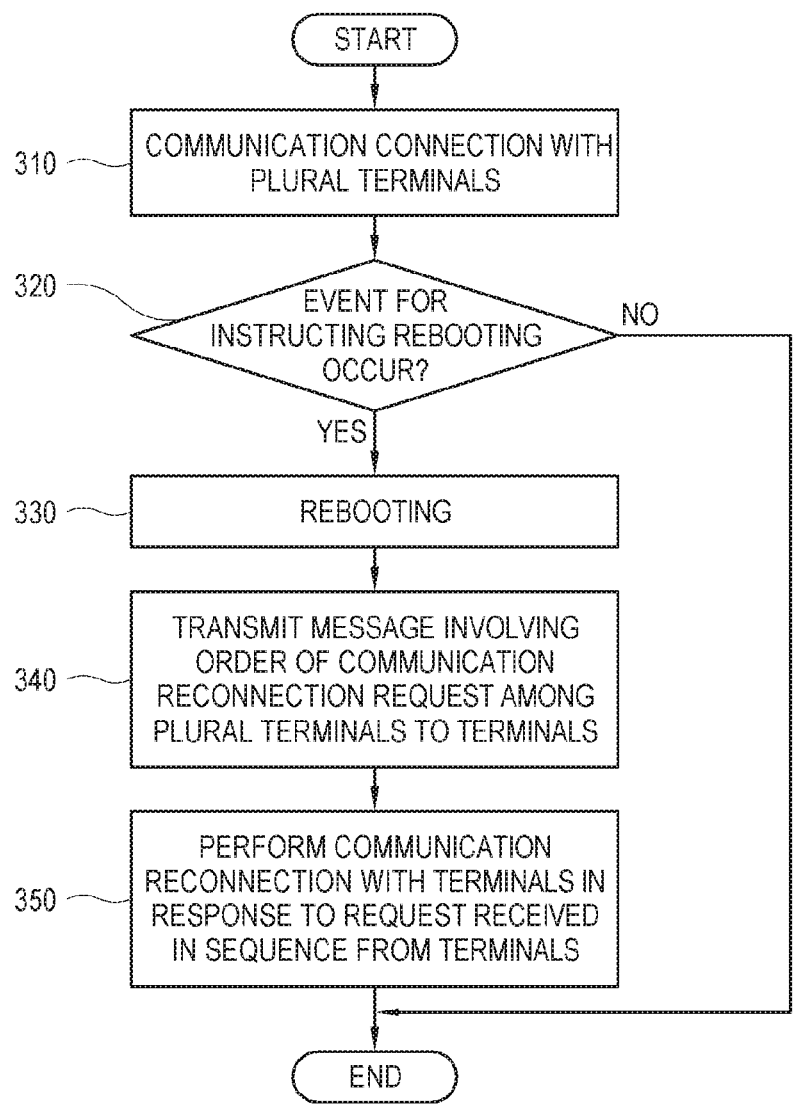
FIG. 3 is a flowchart of controlling the AP according to an embodiment.

FIG. 3 is a flowchart of controlling an AP according to an exemplary embodiment.

As shown in FIG. 3, the following operations are performed by a processor of the AP.

At operation 310, the AP connects and communicates with a plurality of terminals through a preset wireless communication protocol such as Wi-Fi.

At operation 320, the AP determines whether an event for instructing the AP to be rebooted occurs. When this event does not occur, the AP does not perform any special operation, but may maintain a current state. For example, this event may occur when there is a need of upgrading the software of the AP or when there is a communication problem in the AP, or may occur in response to a user's instruction.

When the rebooting instruction event occurs, at operation 330, the AP is rebooted. When the AP is rebooted, the communication connection state between the AP and each terminal is initialized, and thus the AP resumes the communication connection with each terminal as follows.

After the AP is completely rebooted, at operation 340, the AP transmits a message, in which the communication reconnection requests from the plurality of terminals are listed in order, to each terminal. At this time, the AP broadcasts the message.

At operation 350, the AP performs the communication reconnection with each terminal in response to the requests sequentially received from the terminals.

Below, a method of controlling a terminal according to an exemplary embodiment will be described.

Figure 4:
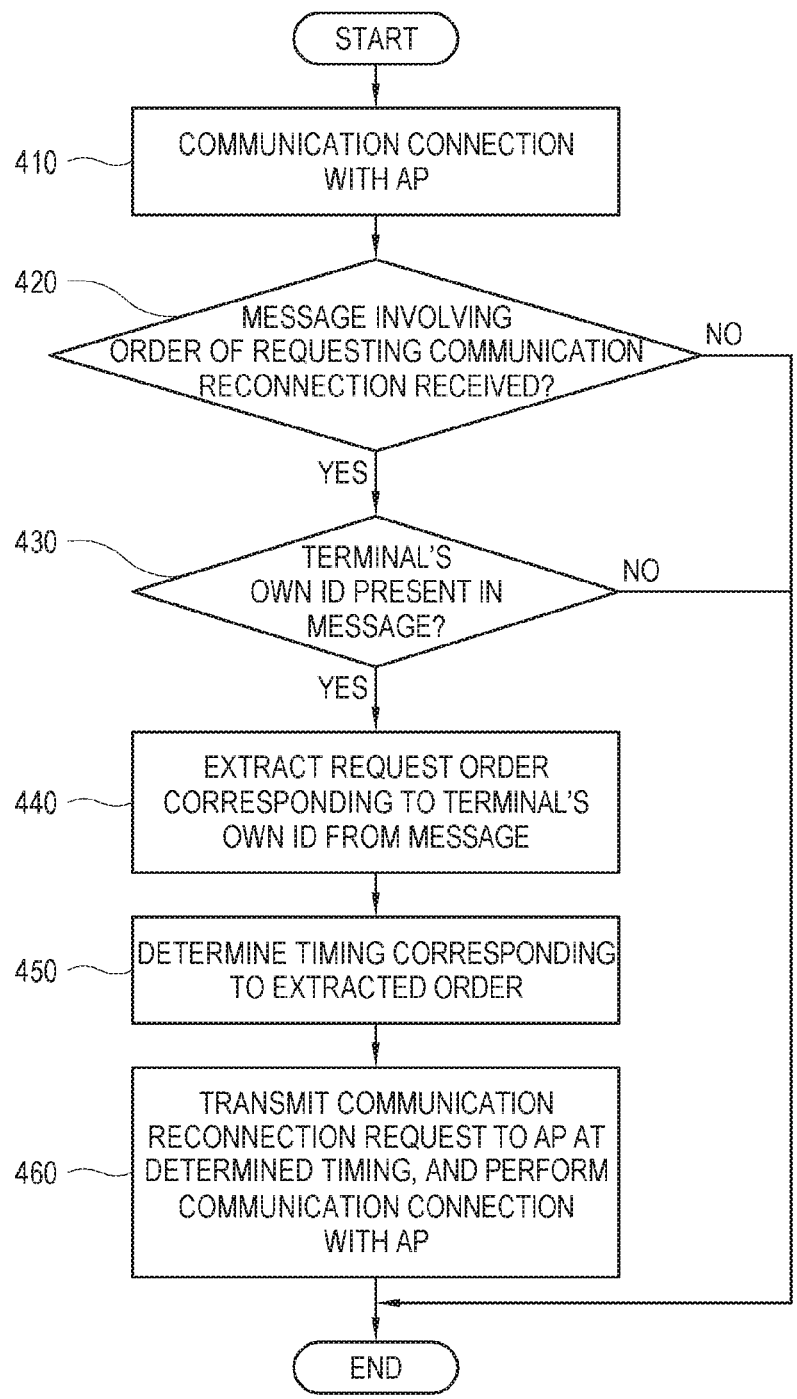
FIG. 4 is a flowchart of controlling the terminal according to an embodiment.

FIG. 4 is a flowchart of controlling the terminal according to an exemplary embodiment.

As shown in FIG. 4, the following operations are performed by a terminal processor of each terminal.

At operation 410, the terminal connects and communicates with the AP through a preset wireless communication protocol.

At operation 420, the terminal determines whether a message about order of the communication reconnection requests to be made to the AP is received. When this message is not received, the terminal does not perform any special operation, but may maintain a current communication connection state. Here, the terminal may use various methods to determine whether data received from the AP corresponds to this message, descriptions of which will be described later.

When the message is received, at operation 430, the terminal determines whether its own identification (ID) is present in the message. When the ID of the terminal is not present in the message, the terminal does not perform any special operation, but may maintain the current communication connection state.

When the ID of the terminal is present in the message, at operation 440, the terminal extracts the request order corresponding to its own ID from the message.

At operation 450, the terminal determines a timing corresponding to the extracted order. It will be described later how to determine the timing.

At operation 460, the terminal transmits the communication reconnection request to the AP at the determined timing, and performs communication connection with the AP in accordance with a response from the AP.

Below, communication reconnection performed between the AP and the plurality of terminals will be described in more detail when the AP is initialized.

Figure 5:
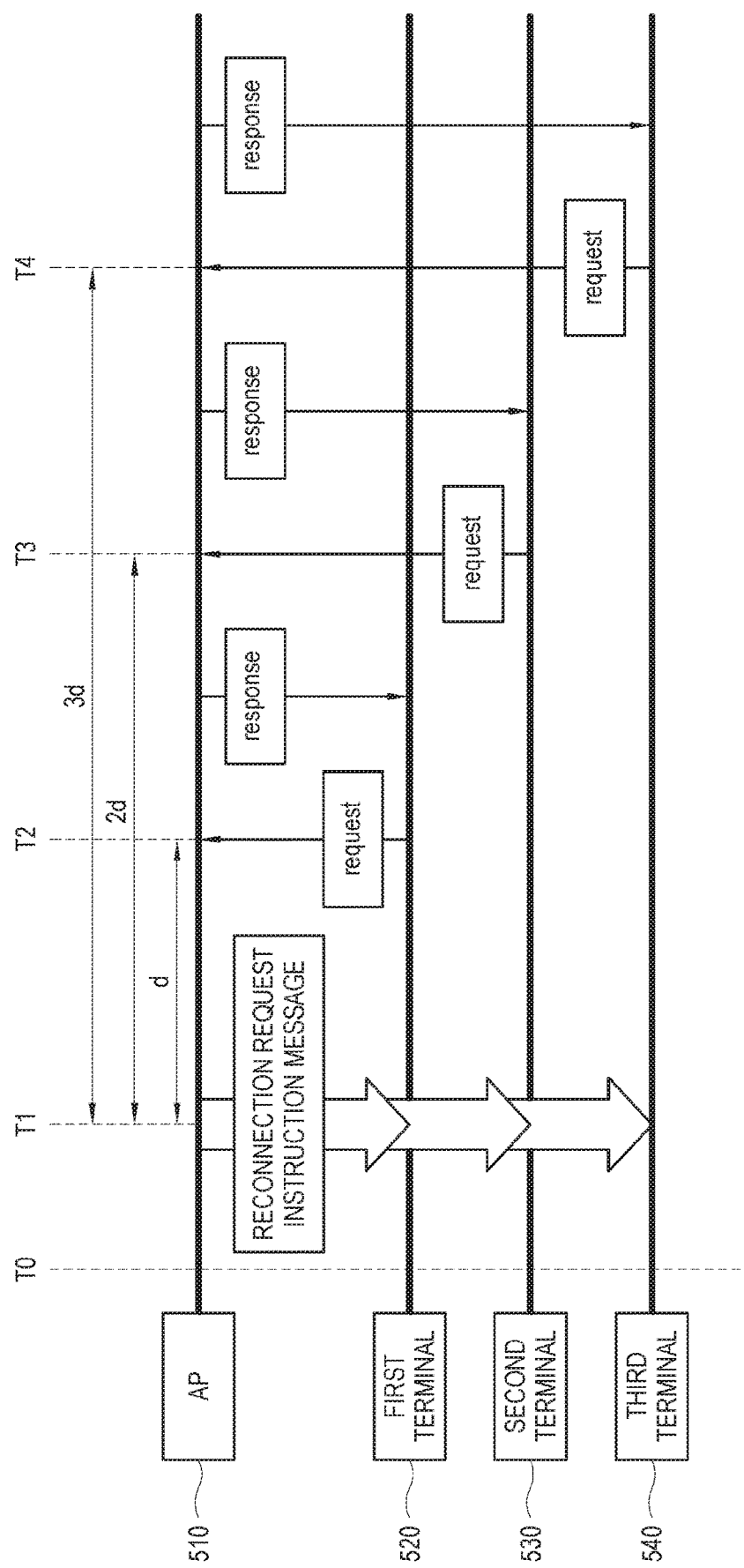
FIG. 5 illustrates communication reconnection performed between the AP and a plurality of terminals when the AP is initialized according to an embodiment.

FIG. 5 illustrates communication reconnection performed between an AP and a plurality of terminals when the AP is initialized according to an exemplary embodiment.

As shown in FIG. 5, an AP 510 may be rebooted for various causes, such as a case where the AP 510 abnormally operates, a case where there is a need of upgrading software of the AP 510, etc. When the AP 510 is rebooted, a communication connection environment established between the AP 510 and the plurality of terminals 520, 530, and 540 is reset or initialized. Thus, the AP 510 operates as follows to establish the communication connection environment again.

At a point in time T0, the AP 510 is completely booted up. At a point in time T1 after a preset period of time elapses from the point in time T0, the AP 510 transmits a reconnection request instruction message to each of the terminals 520, 530, and 540. The preset period of time between the point in time T0 and the point in time T1 corresponds to a short inter-frame space (SIFS) for IEEE 802.11. In IEEE 802.11, a predetermined period of time, which is given for waiting instead of immediately transmitting data to avoid collision when many wireless terminals simultaneously access a shared wireless medium, is called an inter-frame space (IFS), and the SIFS refers to the shortest waiting time among many kinds of IFS.

The AP 510 broadcasts the reconnection request instruction message to the plurality of terminals 520, 530, and 540 at the point in time T1. Because the communication connection is not established between the AP 510 and the plurality of terminals 520, 530, and 540 at this point in time, the AP 510 cannot send the reconnection request instruction message to the terminals 520, 530, and 540 by designating each of the terminals 520, 530, and 540 in a multicast or unicast mode. Instead, the AP 510 broadcasts the reconnection request instruction message within a predetermined reception possible area, so that substantially thus all the apparatuses, which can perform communication using the wireless communication protocol supported in the AP 510, among many apparatuses present in the corresponding area, can receive the reconnection request instruction message. Therefore, the terminals 520, 530, and 540 present within the reception possible area from the AP 510 receive the same reconnection request instruction message.

The reconnection request instruction message involves the SSID of the AP 510; a list of the ID of the plurality of terminals 520, 530, and 540 that were in the communication connection state at a point in time before initialization of the AP 510; and rankings of the terminals 520, 530, and 540 to respectively make reconnection requests to the AP 510. Detailed descriptions of the reconnection request instruction message the AP 510 broadcasts will be made later.

Meanwhile, when the terminal 520, 530, 540 receives predetermined data, the terminal 520, 530, 540 may use various methods to determine whether or not the received data is the reconnection request instruction message. For example, the terminal 520, 530, 540 may determine that the received data is the reconnection request instruction message when the received data includes a list of ID of the plurality of terminals. Alternatively, the reconnection request instruction message may involve a code previously set to a header of data or record information previously set to metadata, and the terminal 520, 530, 540 may determine the data including the code or record information as the reconnection request instruction message.

Each of the terminals 520, 530, and 540 searches for its own ID from the received reconnection request instruction message, and checks a communication reconnection request ranking corresponding to the searched ID. Each of the terminals 520, 530, and 540 determines a timing corresponding to its own ranking, and transmits a communication reconnection request to the AP 510 at the determined timing. In response to the communication reconnection requests received in sequence from the terminals 520, 530, and 540, the AP 510 sequentially transmits responses, which include connection information about a previous communication connection state, to the corresponding terminals 520, 530, and 540. Here, the connection information about the previous communication connection state includes network information and authentication information about the terminal 520, 530, or 540, which have been stored so that the AP 510 can establish the communication connection state with the terminals 520, 530, and 540. Like this, the requests from the terminals 520, 530, and 540 to the AP 510, and the responses from the AP 510 to the terminals 520, 530, and 540 are transmitted in a unicast mode.

In response to the responses from the AP 510, each of the terminals 520, 530, and 540 resumes wireless communication with the AP 510.

Below, operations of each individual terminal 520, 530, or 540 will be described in detail.

At a point in time T1, a first terminal 520, a second terminal 530, and a third terminal 540 receive the reconnection request instruction message from the AP 510. Of course, various factors such as distances from the AP 510, respective communication performances of the terminals 520, 530, and 540, etc. may cause a slight difference in a point in time to receive the reconnection request instruction messages among the first terminal 520, the second terminal 530, and the third terminal 540. However, such a difference is within a margin of error in a case of the wireless communication, and it is therefore regarded that the terminals 520, 530, and 540 receive the reconnection request instruction message at substantially the same point in time.

For example, it will be assumed that the first terminal 520 is designated to have a ranking of #1, the second terminal 530 is designated to have a ranking of #2, and the third terminal 540 is designated to have a ranking of #3 in the reconnection request instruction message. The first terminal 520 checks that its own ranking is #1 from the reconnection request instruction message, and determines a timing corresponding to the ranking #1. There may be various methods of determining the timing corresponding to the ranking. For example, the timing may be determined by a delay of a value, which is obtained by multiplying the ranking and a preset unit time d together, from the point in time T1. Such a unit time refers to a sufficient time for the AP to process an association request of one terminal, which may have various values, for example, dozens to 100 msec.

For example, in a case of d=50 msec, the first terminal 520 determines the timing corresponding to the ranking #1 as a point in time T2 which is 50 msec later from the point in time T1. Thus, the first terminal 520 transmits the reconnection request to the AP 510 at the point in time T2. In response to the reconnection request from the first terminal 520, the AP 510 transmits a reconnection response, which involves the network information for the communication reconnection, to the first terminal 520. The network information refers to information stored through a communication connection procedure between the AP 510 and the first terminal 520 as described in the foregoing embodiment. By receiving the network information from the AP 510, the first terminal 520 resumes the communication connection with the AP 510.

On the same principle, the second terminal 530 determines the timing corresponding to the ranking #2 as a point in time T3 which is 100 msec later from the point in time T1, and the third terminal 540 determines the ranking #3 as a point in time T4 which is 150 msec later from the point in time T1. The second terminal 530 and the third terminal 540 transmit the reconnection requests to the AP 510 at the points in time T3 and T4, respectively.

Thus, the AP 510 according to the exemplary embodiment allows the first terminal 520, the second terminal 530, and the third terminal 540 to respectively make the reconnection requests at different times when the communication reconnection is required, thereby avoiding a collision phenomenon that may occur when the first terminal 520, the second terminal 530, and the third terminal 540 make the reconnection requests at the same time.

Below, the communication reconnection request instruction message to be broadcasted by the AP 510 will be described.

Figure 6:
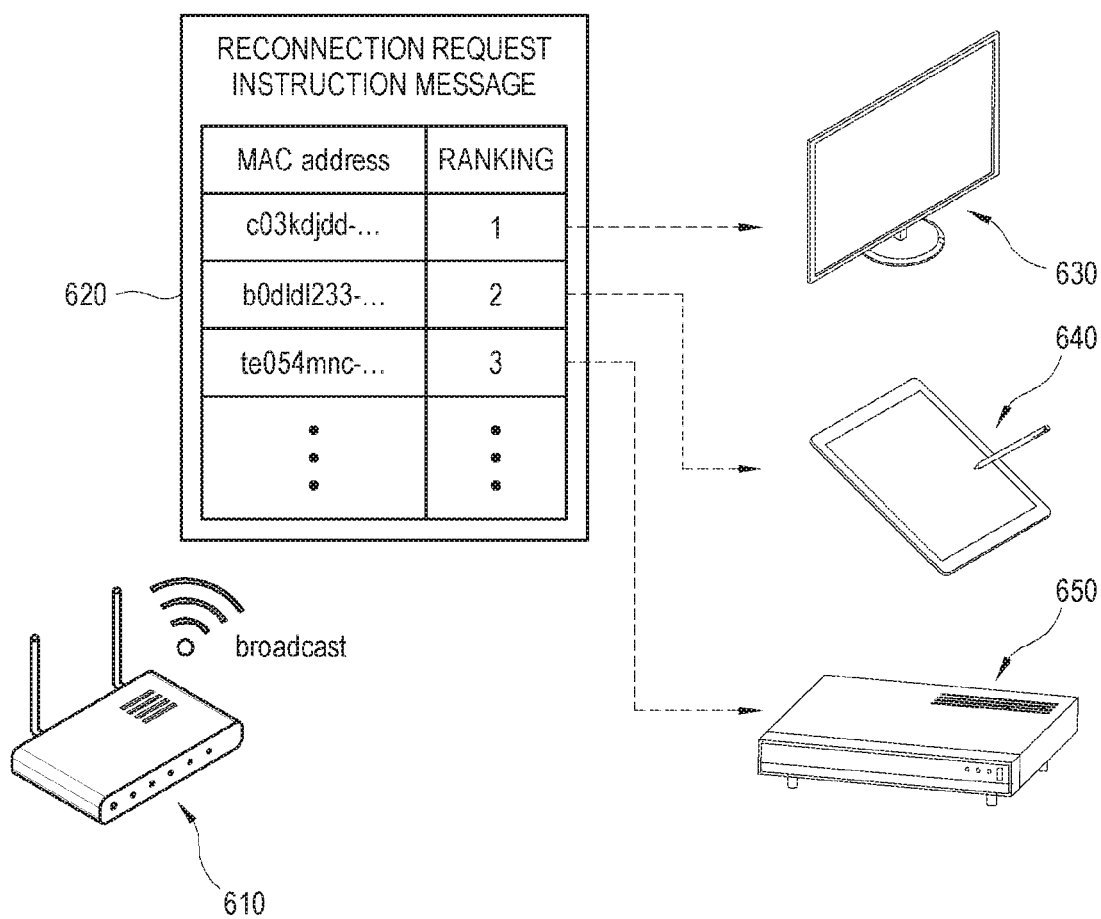
FIG. 6 illustrates an example of a reconnection request instruction message broadcasted by the AP according to an embodiment.

FIG. 6 illustrates an example of a reconnection request instruction message to be broadcast by an AP according to an exemplary embodiment.

As shown in FIG. 6, a network system includes an AP 610, a first terminal 630, a second terminal 640, and a third terminal 650. The AP 610 may be rebooted for a predetermined cause while being connected for wireless communication with the terminals 630, 640, and 650. As the AP 610 is rebooted, the wireless communication connection with the terminals 630, 640, and 650 is initialized. Thus, the AP 610 broadcasts the reconnection request instruction message 620.

The reconnection request instruction message 620 includes at least information about identification names of all the terminals 630, 640, and 650 that were in the previous communication connection state, and rankings respectively assigned to the identification names of the terminals 630, 640, and 650. Here, a reason why the reconnection request instruction message 620 is targeted not for a specific terminal 630, 640, or 650 but all the terminals 630, 640, and 650 that were in the previous communication connection state with the AP 610 is as follows.

The initialization of the communication connection state means that there are no terminals 630, 640, and 650 being in the communication connection state with the AP 610. In other words, the AP 610 cannot designate each individual terminal 630, 640, or 650 to which a signal will be sent. Therefore, the AP 610 sends the reconnection request instruction message 620 to an unspecific target in the broadcast mode, and each individual terminal 630, 640, or 650 checks its own ID from the reconnection request instruction message 620. To this end, the reconnection request instruction message 620 involves the identification names of all the terminals 630, 640, and 650 targeted for the communication reconnection.

The identification names of the terminals 630, 640, and 650 recorded in the reconnection request instruction message 620 are given for making each individual terminal 630, 640, or 650 to determine its own ranking, and there may be various kinds of identification name. In the embodiment, the identification names of the terminals 630, 640, and 650 may be provided as media access control (MAC) addresses of the terminals 630, 640, and 650. However, the identification names of the terminals 630, 640, and 650 may be provided as unique ID of a processor of each individual terminal 630, 640, or 650, or an index number assigned to each individual terminal 630, 640, or 650 in the network system. Each individual terminal 630, 640, or 650 searches for its own MAC address in the reconnection request instruction message 620, and checks the ranking corresponding to the searched MAC address.

Thus, each individual terminal 630, 640, or 650 can determine the ranking for making its own reconnection request from the reconnection request instruction message 620.

Below, a method of determining the ranking of each individual terminal 630, 640, or 650 when the AP 610 generates the reconnection request instruction message 620 will be described.

Figure 7:
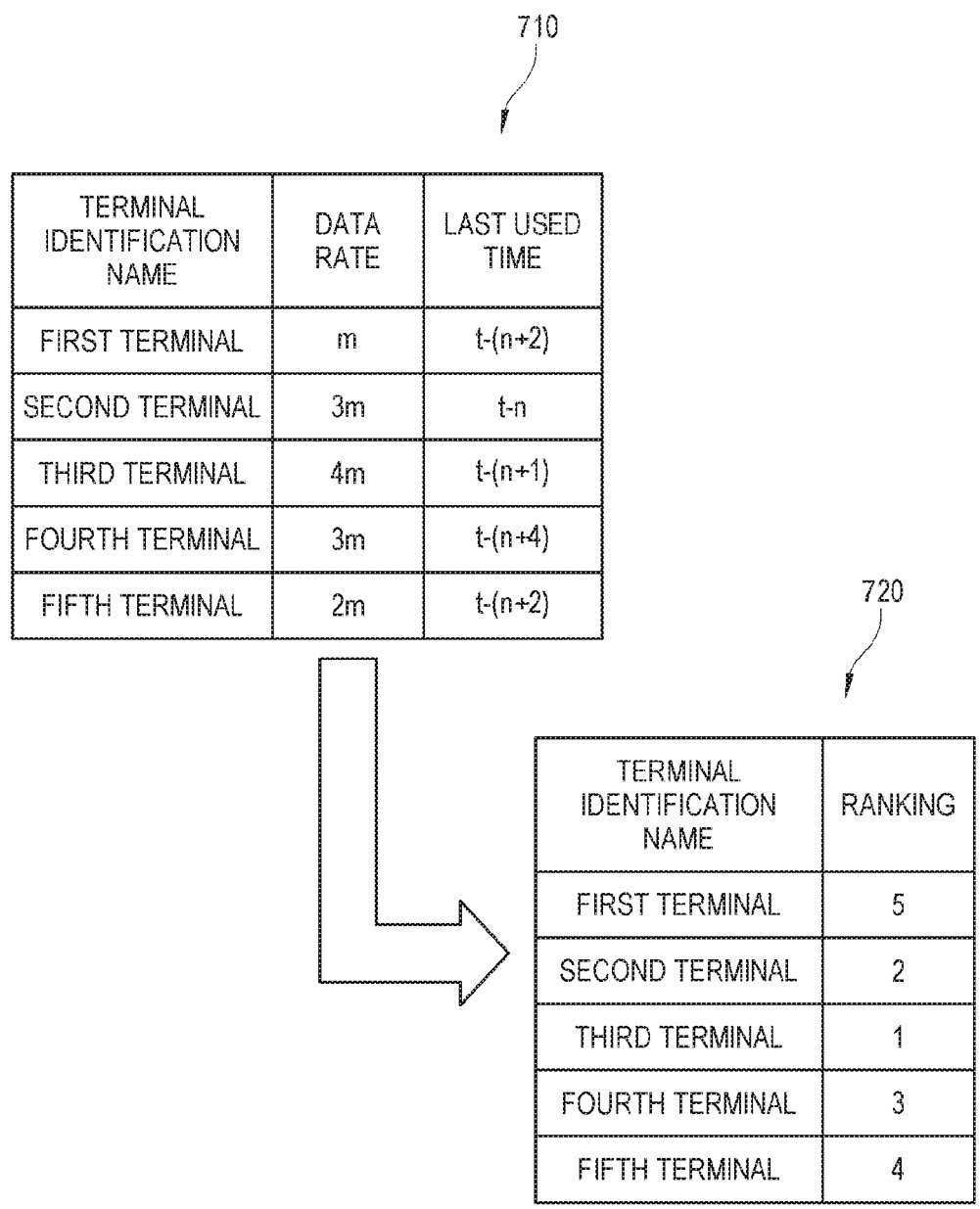
FIG. 7 illustrates an example of a principle that the AP determines rankings of the plurality of terminals in a reconnection request instruction message according to an embodiment.

FIG. 7 illustrates an example of a principle that the AP determines rankings of a plurality of terminals in a reconnection request instruction message according to an exemplary embodiment.

As shown in FIG. 7, the AP stores association information 710 for communication connection with the plurality of terminals when it connects for communication with the terminals. The association information 710 is retained as it is even though the communication connection state of the AP is initialized. As described above, the AP may determine rankings of the terminals based on the previously stored association information 710 when generating a reconnection request instruction message 720.

The association information 710 includes information about data rates, i.e. data transmission/reception speeds of last time when the terminals transmitted and received data before initializing the AP, and points in time when the terminals were last used to communicate with the AP. For example, the data rate may be given as a modulation and coding scheme (MCS) value, but not limited to a specific scheme. Further, the point in time when each individual terminal was used last may be called a last used time (LUT).

In FIG. 7, 'm', 'n', and 't', which are used as values in the respective fields of the LUT and the data rate, are greater than 0, and simplified for convenience to compare the values. Referring to the association information 710, the third terminal has the highest data rate, and the first terminal has the lowest data rate. Further, referring to the association information 710, the latest communication with the AP was done by the second terminal, and the oldest communication with the AP was done by the fourth terminal.

The AP acquires the data rates of the plurality of terminals from the association information 710. The AP compares the data rates of the terminals, and ranks the terminals in order of high data rate. Referring to the association information 710, the third terminal has the highest data rate, the second terminal and the fourth terminal have the same next-high data rate, and the fifth terminal and the first terminal have the next-high data rates in sequence.

Because the second terminal and the fourth terminal have the same data rate, the AP determines what terminal is has a relatively recent LUT based on the association information 710. Referring to the association information 710, the LUT of the second terminal is relatively close to the current point of time because the second terminal has an LUT of 't-n' and the fourth terminal has an LUT of 't-(n+4)'. Thus, the AP makes the ranking of the second terminal be higher than the ranking of the fourth terminal.

On this principle, the AP records the reconnection request instruction message 720 by making the third terminal have the first ranking, the second terminal have the second ranking, the fourth terminal have the third ranking, the fifth terminal have the fourth ranking, and the first terminal have the fifth ranking.

Like this, the AP determines the ranking of each terminal based on the data rate of the association information 710. When there are terminals having substantially the same data rates, the rankings of the terminals are determined based on the time of last communication with the AP. Thus, the AP determines the ranking of each terminal based on the association information 710.

The AP in the embodiment determines the ranking of each terminal by primarily considering the data rate and secondarily considering the LUT, but there are no limits to the embodiment. Alternatively, the AP may determine the ranking by primarily taking the LUT into account, or referring to another piece of information involved in the association information 710. For example, the AP may determine the ranking of each terminal in order of high frequency of connection between each terminal and the AP. Alternatively, the AP may give priority to a certain terminal previously designated by a user.

The methods according to the foregoing exemplary embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program instruction recorded in the storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

REFERENCE NUMERALS

210: AP
211: communicator
212: storage
213: processor
220: terminal
221: terminal communicator
222: terminal storage
223: terminal processor

What is claimed is:

1. An electronic apparatus comprising:
a communicator; and
a processor configured to:
   control the communicator to establish first respective connections between a plurality of terminals and the electronic apparatus,
   determine that the first respective connections between the plurality of terminals and the electronic apparatus have been disconnected,
   control the communicator to transmit a communication connection order message, including a communication connection order for the plurality of terminals, from the electronic apparatus to the plurality of terminals,
   receive respective association requests through the communicator from the plurality of terminals in response to the transmitted communication connection order message, and
   control the communicator to sequentially establish second respective connections with each of the plurality of terminals based on the received respective association requests.

2. The electronic apparatus according to claim 1, wherein the processor is configured to control the communicator to establish a communication connection with a first terminal of the plurality of terminals, and establish a communication connection with a second terminal of the plurality of terminals after the communication connection with the first terminal of the plurality of terminals is established.

3. The electronic apparatus according to claim 1, wherein the processor is configured to determine that the first respective connections between the plurality of terminals and the electronic apparatus have been disconnected when the electronic apparatus is rebooted.

4. The electronic apparatus according to claim 1, further comprising a memory configured to store association information about the first respective connections between the plurality of terminals and the electronic apparatus, wherein the processor is configured to determine the communication connection order for the plurality of terminals based on the association information stored in the memory.

5. The electronic apparatus according to claim 1, wherein the processor is configured to control the communicator to transmit the communication connection order message in a broadcast mode.

6. The electronic apparatus according to claim 1, wherein the communication connection order message comprises respective media access control (MAC) addresses of each of the plurality of terminals for identifying each of the plurality of terminals.

7. The electronic apparatus according to claim 1, wherein the association information comprises respective information about at least one of a data rate, a communication point in time, and a communication frequency of each of the plurality of terminals.

8. The electronic apparatus according to claim 1, wherein the processor is configured to control the communicator to transmit the communication connection order message with preset identification information for use by the plurality of terminals to identify whether data received therein corresponds to the communication connection order message.

9. A terminal apparatus comprising:
a communicator; and
a processor configured to:
control the communicator to establish a first connection with an electronic apparatus,
determine that the established first connection with the electronic apparatus has been disconnected,
receive a communication connection order message, including a communication connection order for a plurality of terminals including the terminal apparatus, through the communicator from the electronic apparatus, and
control the communicator to transmit, to the electronic apparatus at a time indicated by the communication connection order for the terminal apparatus, an association request in response to the received communication connection order message.

10. The terminal apparatus according to claim 9, wherein the processor is configured to control the communicator to transmit the association request at a point in time corresponding to the communication connection order and delayed from a point in time of receiving the communication connection order message.

11. A method of controlling an electronic apparatus, the method comprising:
performing, by a processor of the electronic apparatus, operations including:
controlling a communicator of the electronic apparatus to establish first respective connections between a plurality of terminals and the electronic apparatus;
determining that the first respective connections between the plurality of terminals and the electronic apparatus have been disconnected;
controlling the communicator to transmit a communication connection order message, including a communication connection order for the plurality of terminals, from the electronic apparatus to the plurality of terminals; and
control the communicator to sequentially establish second respective connections with each of the plurality of terminals based on association requests respectively received from the plurality of terminals in response to the transmitted communication connection order message.

12. The method according to claim 11, wherein the operations further include controlling the communicator to establish a communication connection with a first terminal of the plurality of terminals, and establish a communication connection with a second terminal of the plurality of terminals after the communication connection with the first terminal of the plurality of terminals is established.

13. The method according to claim 11, wherein the operations further include determining that the first respective connections between the plurality of terminals and the electronic apparatus have been disconnected when the electronic apparatus is rebooted.

14. The method according to claim 11, wherein the operations further include determining the communication connection order for the plurality of terminals based on stored association information about the first respective connections between the plurality of terminals and the electronic apparatus.

15. The method according to claim 11, wherein the communication connection order message is transmitted in a broadcast mode.

16. The method according to claim 11, wherein the communication connection order message comprises respective media access control (MAC) addresses of each of the plurality of terminals for identifying each of the plurality of terminals.

17. The method according to claim 11, wherein the association information comprises respective information about at least one of a data rate, a communication point in time, and a communication frequency of each of the plurality of terminals.

18. The method according to claim 11, wherein the operations further include controlling the communicator to transmit the communication connection order message with preset identification information for use by the plurality of terminals to identify whether data received therein corresponds to the communication connection order message.

19. A method of controlling a terminal apparatus, the method comprising:
performing, by a processor of the terminal apparatus, operations including:
controlling a communicator of the terminal apparatus to establish a first connection with an electronic apparatus;
determining that the established first connection with the electronic apparatus has been disconnected;
receiving a communication connection order message, including a communication connection order for a plurality of terminals including the terminal apparatus, through the communicator from the electronic apparatus; and
controlling the communicator to transmit, to the electronic apparatus at a time indicated by the communication connection order for the terminal apparatus, an association request in response to the received communication connection order message.

20. The method according to claim 19, wherein the operations further include transmitting the association request at a point in time corresponding to the communication connection order and delayed from a point in time of receiving the communication connection order message.

* * * * *